United States Patent [19]

Sorensen

[11] Patent Number: 4,959,005

[45] Date of Patent: Sep. 25, 1990

[54] SELF-ALIGNING MOLD FOR INJECTION MOLDING OF HOLLOW PLASTIC PRODUCTS

[75] Inventor: Jens O. Sorensen, Rancho Santa Fe, Calif.

[73] Assignee: Primtec, Rancho Santa Fe, Calif.

[21] Appl. No.: 314,436

[22] Filed: Feb. 23, 1989

[51] Int. Cl.⁵ .............................................. B29C 45/04
[52] U.S. Cl. .................................... 425/577; 249/161; 264/328.11
[58] Field of Search ............................... 425/575, 577; 264/328.8, 328.11, 328.12; 249/142, 161, 144, 145

[56] References Cited

U.S. PATENT DOCUMENTS

| | | | |
|---|---|---|---|
| 2,524,858 | 10/1950 | Thomas | 425/577 X |
| 3,375,554 | 4/1968 | Blummer | 249/142 |
| 3,397,266 | 8/1968 | Ayres | 264/328.12 |
| 3,476,852 | 11/1969 | Shattuck | 264/328.12 X |
| 3,737,272 | 6/1973 | Segmuller | 425/595 |
| 3,829,548 | 8/1974 | Edwards | 264/328.12 |
| 4,467,994 | 8/1984 | Sorensen | 249/144 |
| 4,492,555 | 1/1985 | Schulte | 264/328.8 X |
| 4,497,766 | 2/1985 | Olsson et al. | 264/328.12 X |
| 4,508,676 | 4/1985 | Sorensen | 264/328.8 |
| 4,657,141 | 4/1987 | Sorensen | 206/519 |
| 4,726,758 | 2/1988 | Sekine et al. | 425/575 |
| 4,752,199 | 6/1988 | Arai | 264/328.12 X |
| 4,789,326 | 12/1988 | Sorensen | 425/575 |
| 4,818,462 | 4/1989 | Murano | 264/328.8 |

FOREIGN PATENT DOCUMENTS 117387 9/1970 Denmark.
54-22481 2/1979 Japan ............................ 264/328.12

Primary Examiner—Richard L. Chiesa
Attorney, Agent, or Firm—Edward W. Callan

[57] ABSTRACT

A self aligning mold for injection molding and controlling the dimensions of a hollow plastic product having a rim, a base and a side wall therebetween. The base-forming portion of a first mold part includes a brink that protrudes in a direction toward a second mold part, and the base-forming portion of the second mold part includes a labrum that protrudes in a direction toward the first mold part to define a throttle situated between the brink and the labrum. The throttle has a variable width, which at any throttle position is defined by the distance between the brink and the labrum. The mold cavity gate is located within an area encompassed by the throttle. The throttle width varies when the first and second mold parts are not axially aligned to thereby, during injection, admit more material into the side wall-forming portion of the mold cavity that is the thinnest as a result of the axial misalignment, for the purpose of forcing the first and second mold parts into alignment. The mold cavity includes flow channels for directing injected plastic material from the base-forming portion of the mold cavity toward the rim-forming portion of the mold cavity, with at least certain particular flow channels having a mold cavity thickness that is significantly thicker than double the prevailing mold cavity thickness between the flow channels when the first and second mold parts are aligned and assembled. The certain particular flow channels prevent such extensive lateral flow of the plastic material as would maintain the axial misalignment of the mold parts. Laminated products are molded by using a third mold part, which in combination with the product formed by the first and second mold parts inherently defines secondary flow channels.

29 Claims, 4 Drawing Sheets

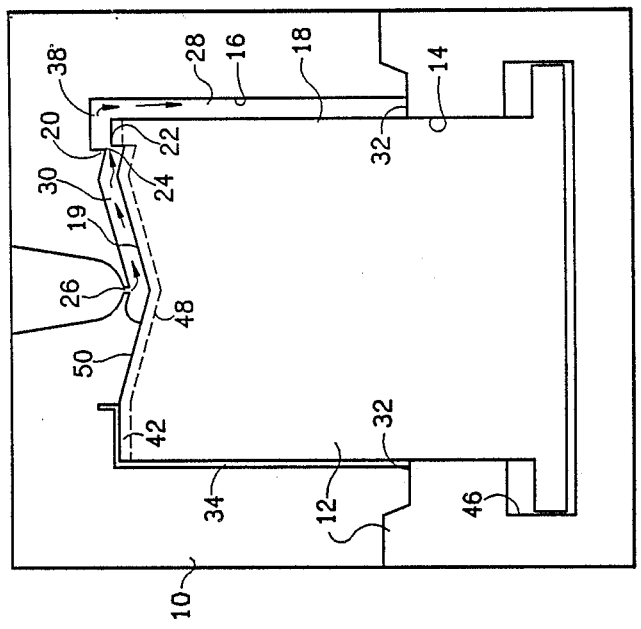
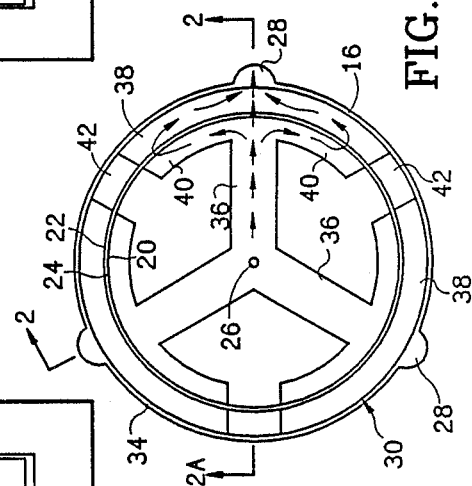
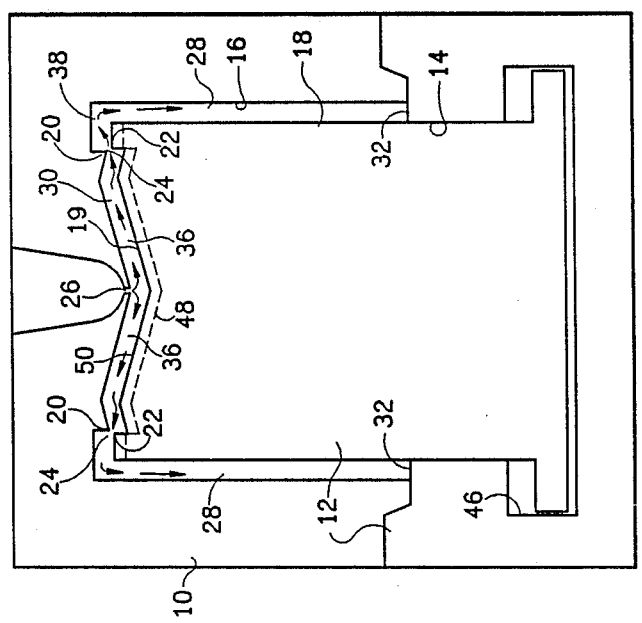

SELF-ALIGNING MOLD FOR INJECTION MOLDING OF HOLLOW PLASTIC PRODUCTS

BACKGROUND OF THE INVENTION

The present invention generally pertains to injection molding of plastic products and is particularly directed to an improvement in a self-aligning mold for injection molding of hollow plastic products.

A self-aligning mold is described in U.S. Pat. No. 3,375,554. The mold described therein includes a cavity mold part and a core mold part mounted for axial movement with respect to each other, and defining a mold cavity therebetween for forming the hollow plastic product. There is an axially positioned gate in the cavity mold part for admitting injected plastic into the mold cavity. The mold cavity includes a circular base region for forming the bottom portion of the product and a region that extends from the base region for forming the side wall of the product. The base region includes a throttle that is concentric with respect to the gate but varies circumferentially in width when the mold parts are not axially aligned to thereby admit more injected plastic material into the portion of the region that is the thinnest as a result of said axial misalignment for the purpose of forcing the mold parts into alignment. Unfortunately, the path of least resistance for the plastic material flowing into the region is generally lateral, and as a result the plastic material flowing into the thinnest portion of the region from the throttle moves around to the thickest portion of the region and maintains a significant portion of the axial misalignment of the mold parts.

SUMMARY OF THE INVENTION

The present invention improves the mold described in U.S. Pat. No. 3,375,554 in such a manner as to provide a truly self-aligning mold for injection molding of symmetrical hollow stackable products.

The present invention provides a self aligning mold for injection molding and controlling the dimensions of a hollow plastic product having a rim, a base and a side wall therebetween. The mold includes a first mold part and a second mold part, which when assembled by axial movement with respect to each other, define a mold cavity for forming the plastic product. The base-forming portion of the first mold part includes a brink that protrudes in a direction toward the second mold part, and the base-forming portion of the second mold part includes a labrum that protrudes in a direction toward the first mold part to define a throttle situated between the brink and the labrum. The throttle has a variable width, which at any throttle position is defined by the distance between the brink and the labrum. The mold cavity gate is located within an area encompassed by the throttle. The throttle width varies when the first and second mold parts are not axially aligned to thereby, during injection, admit more material into the side wall-forming portion of the mold cavity that is the thinnest as a result of the axial misalignment, for the purpose of forcing the first and second mold parts into alignment. The mold cavity includes flow channels for directing injected plastic material from the base-forming portion of the mold cavity toward the rim-forming portion of the mold cavity, with the mold cavity thickness at the flow channels being generally thicker than the prevailing mold cavity thickness between the flow channels, and with at least certain particular flow channels having a mold cavity thickness that is significantly thicker than double the prevailing mold cavity thickness between the flow channels when the first and second mold parts are aligned and assembled. The certain particular flow channels direct plastic into only those portions of the side-wall forming portion of the mold cavity as are between adjacent certain particular flow channels and thus prevent such extensive lateral flow of the plastic material as would maintain the axial misalignment of the mold parts.

In a separate aspect of the present invention, a mold of the type described in U.S. Pat. No. 3,375,554 is improved by the feature of at least one of the mold parts defining an axial conduit and having an axially protractable and retractable ram-shaped element within the conduit, with a front portion of the ram-shaped element defining a part of the mold cavity; and the mold further including means for retracting the ram-shaped element during injection after an initial amount of plastic material has been injected into the mold cavity. In one embodiment according to this aspect to the invention the front portion of the ram-shaped element encompasses said brink or labrum, so that the throttle width may be increased when the ram-shaped element is retracted in order to form a thicker-walled product at the throttle. The front portion of the ram-shaped element may include a contact element for contacting the other mold part in such a manner as to rigidly secure the first mold part in alignment with the second mold part when the ram-shaped element is protracted while plastic material is initially injected into the mold cavity. The front portion of the ram-shaped element may also include a contact element shaped for contacting a large area of the other mold part when the ram-shaped element is protracted to thereby reduce the required force for clamping the mold while plastic material is initally injected into the mold cavity when the ram-shaped element is protracted. The front portion of the ram-shaped element may also define a part of the mold cavity for forming a portion of the base of the product when the ram-shaped element is protracted, with said formed portion of the product base defining said brink or labrum when the ram-shaped element is retracted while retaining said portion of the base of the product formed by injection of plastic material into the mold cavity while the ram-shaped element was protracted.

In another aspect of the present invention, a mold for injection molding, laminating and controlling the dimensions of a hollow plastic product having a rim, a base and a side wall therebetween, includes a first mold part and a second mold part, which when assembled by axial movement with respect to each other, define a first mold cavity for forming the plastic product; and a third mold part, which, when assembled with the first mold part by axial movement with respect to each other while the first mold part is retaining a first layer of said plastic product formed by plastic material inserted into the first mold cavity, defines a second mold cavity for forming a second layer of the plastic product. The base-forming portion of the first layer of plastic material retained by the first mold part includes a brink or labrum formed in the first mold cavity by the second mold part, with the brink or labrum protruding in a direction toward the third mold part; and the base-forming portion of the third mold part includes a lubrum or brink respectively that protrudes in a direction toward the first mold part to define a throttle situated between the brink and the labrum. The throttle has a variable width, which at any throttle position is defined by the distance between the brink and the labrum. The throttle width varies when the first and third mold parts are not axially aligned to thereby, during injection, admit more material into the side wall-forming portion of the second mold cavity that is the thinnest as a result of said axial misalignment, for the purpose of forcing the first and third mold parts into axial alignment.

In still another aspect of the present invention, a mold for injection molding and laminating a hollow plastic product having a rim, a base and a side wall therebetween, includes a first mold part and a second mold part, which when assembled by axial movement with respect to each other, define a first mold cavity for forming said plastic product; wherein the first mold cavity includes primary flow channels for directing injected plastic material from the base-forming portion of the first mold cavity toward the rim-forming portion of the first mold cavity, with the first mold cavity thickness at the primary flow channels being generally thicker than the prevailing mold cavity thickness between the primary flow channels; and a third mold part, which, when assembled with the first mold part by axial movement with respect to each other while the first mold part is retaining a first layer of said plastic product formed by plastic material inserted into the first mold cavity, defines a second mold cavity for forming a second layer of said plastic product; wherein the first layer of plastic material is so shaped by the first mold cavity as to define secondary flow channels in the second mold cavity for directing plastic material injected into the second mold cavity from the base-forming portion of the second mold cavity toward the rim-forming portion of the second mold cavity. This aspect of the invention is particularly useful for injection molding performed parisons from which laminated containers are blow molded.

In a still further aspect of the present invention, a mold for injection molding, laminating and controlling the dimensions of a hollow plastic product having a rim, a base and a side wall therebetween, includes a first mold part and a second mold part, which when assembled by axial movement with respect to each other, define a mold cavity for forming said plastic product; wherein a base-forming portion of the first mold part includes a brink that protrudes in a direction toward the second mold part, and a base-forming portion of the second mold part includes a labrum that protrudes in a direction toward the first mold part to define a throttle situated between said brink and said labrum, the throttle having a variable width, which at any throttle position is defined by the distance between said brink and said labrum; wherein the mold cavity defines a gate located within an area encompassed by the throttle; and wherein the throttle width varies when the first and second mold parts are not axially aligned to thereby, during injection, admit more material into the side wall-forming portion of the mold cavity that is the thinnest as a result of said axial misalignment, for the purpose of forcing the first and second mold parts into alignment; and a third mold part, which, when assembled with the first mold part by axial movement with respect to each other while the first mold part is retaining a first layer of said plastic product formed by plastic material inserted into the first mold cavity, defines a second mold cavity for forming a second layer of said plastic product.

The present invention further provides methods utilizing the molds of the present invention.

Additional features of the present invention are described in relation to the description of the preferred embodiment.

BRIEF DESCRIPTION OF THE DRAWINGS

FIG. 1 is an end view of the mold cavity defined by one preferred embodiment of the mold of the present invention.

FIG. 2 is a sectional view of a mold defining the mold cavity of FIG. 1 taken along lines 2—2.

FIG. 2A is a sectional view of a mold defining the mold cavity of FIG. 1 taken along lines 2A-2.

DESCRIPTION OF THE PREFERRED EMBODIMENTS

Figure 4:
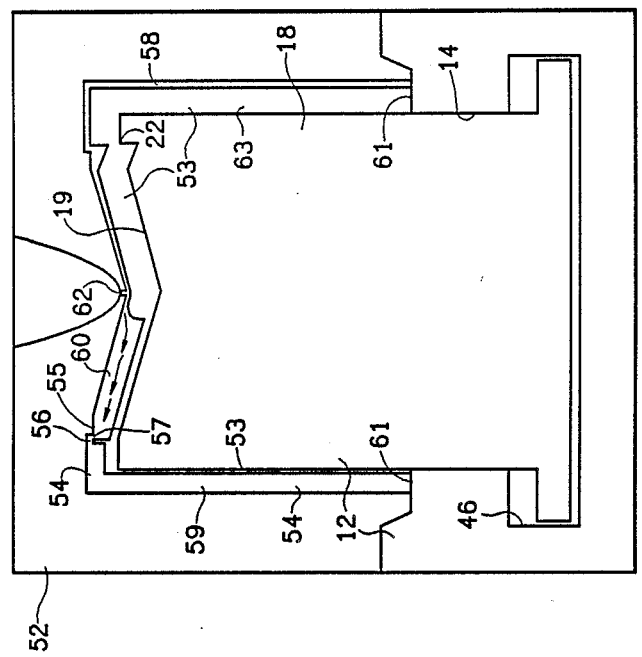
FIG. 4 is a topological sectional view a mold defining the mold cavity of FIG. 3 taken along lines 4—4 in accordance with the distance from the mold cavity axis.

Referring to FIGS. 1, 2 and 2A, one preferred embodiment of the self-aligning mold of the present invention includes a cavity mold part 10 and a core mold part 12.

The cavity mold part 10 and the core mold part 12 are assembled by axial movement with respect to each other, and as so assembled, define a mold cavity 16 for forming a hollow plastic product having a rim, a base and a side wall therebetween.

The core mold part 12 defines a conduit 14, and has an axially protractable and retractable ram-shaped element 18 within the conduit 14. A front portion 19 of the ram-shaped element 18 defines a portion of the mold cavity 16.

The base-forming portion of the cavity mold part 10 includes a brink 20 that protrudes in a direction toward the core mold part 12. The base-forming portion of the core mold part 12 includes a labrum 22 that protrudes in a direction toward the cavity mold part 10 to define a throttle 24 situated between the brink 20 and the labrum 22. The throttle 24 has a variable width, which at any throttle position is defined by the distance between the brink 20 and the labrum 22.

The brink 20 does not project beyond the labrum 22. This features prevents the brink 20 from contacting the labrum 22. Such contact would cause wear upon the brink 20 and the labrum 22 and eventually alter the dimensions of the throttle 24.

The cavity mold part 10 also defines a gate 26, which is located within an area encompassed by the throttle 24.

The width of the throttle 24 varies when the cavity mold part 10 and the core mold part 12 are not axially aligned to thereby, during injection of plastic material from the gate 26, admit more material into the side wall-forming portion of the mold cavity 16 that is the thinnest as a result of said axial misalignment, for the purpose of forcing the cavity mold part 10 and core mold part 12 into axial alignment.

The mold cavity 16 includes certain particular flow channels 28 for directing injected plastic material from the base-forming portion 30 of the mold cavity 16 toward the rim-forming portion 32 of the mold cavity 16. One end of each of the certain particular flow channels 28 is located adjacent the throttle 24. The certain particular flow channels 28 have a mold cavity thickness that is significantly thicker than double the prevailing mold cavity thickness between the flow channels 28 when the cavity mold part 10 and the core mold part 12 are aligned and assembled. The mold cavity 16 may also include additional flow channels (not shown), which are generally thicker than the prevailing mold cavity thickness between the flow channels 28.

The certain particular flow channels 28 direct plastic into only those portions of the side-wall forming portion 34 of the mold cavity 16 as are between adjacent certain particular flow channels 28 and thus prevent such extensive lateral flow of the plastic material as would maintain the axial misalignment of the mold parts 10, 12.

The base-forming portion 30 of the mold cavity 16 includes a plurality of feed channels 36, 38. The feed channels 36 extend radially from the gate 26 to a position adjacent the throttle 24 and then divide into branches 40 that extend adjacent and collaterally to the throttle on the side of the throttle that is closest to the gate to more uniformly distribute the injected plastic material from the gate 26 to the throttle 24. The feed channels 38 extend adjacent and collaterally to the throttle 24 on the side of the throttle that is closest to the side wall forming portion 34 of the mold cavity 16.

The base-forming portion 30 of the mold cavity 16 also includes a plurality of barricades 42 located between adjacent feed channels 38 in order prevent lateral flow within the feed channels 38 of plastic material that has passed through the throttle 24 beyond the midpoint between adjacent certain particular flow channels 28. The barricades 42 in combination with the feed channels 38 tend to direct the plastic material that has passed through the throttle 24 back toward the certain particular flow channel 28 that is adjacent the radial portion of the feed channel 36 that is bordered by the barricates 42. The main direction of flow of the plastic material is illustrated by arrows in FIG. 1.

The respective sizes of the feed channels 36, 38, branches 40, barricades 42, throttle 24, flow channels 28 and side-wall forming portion 34 of the mold cavity 16 are greatly exaggerated in relation to the size of the mold in order to better illustrate these features. Also, in order to better illustrate the feed channels 36 and flow channels 28 the number thereof shown in the Drawing are less than the number thereof that are included in a preferred embodiment. In addition, the side walls of the mold cavity 16 may be other than cylindrical.

Although the throttle 24 is illustrated in FIG. 1 as a continuous perimetric throttle, the throttle 24 may be intermittent or segmented.

In other embodiments of the invention (not shown) the mold cavity defines a plurality of concentric throttles.

The mold includes a hydraulic cylinder 46 for retracting the ram-shaped element 18 during injection after an initial amount of plastic material has been injected into the mold cavity 16. After the injected plastic material has reached at least the neighborhood of the rim-forming portion 32 of the mold cavity 16, the ram-shaped element 18 is retracted so that the front portion 19 is at the position 48 shown by the dashed lines to thereby enable additionally injected plastic material to thicken the end-wall portion of the plastic product, including particularly the portion of the plastic product defined by the throttle 24.

The front portion 19 of the ram-shaped element 18 encompasses the labrum 22, so that the width of the throttle 24 may be increased when the ram-shaped element 18 is retracted in order to form a thicker-walled product at the throttle.

The front portion 19 of the ram-shaped element 18 includes a contact element 50 for contacting the cavity mold part 10 in such a manner as to rigidly secure the core mold part 12 in alignment with the cavity mold part 10 when the ram-shaped element 18 is protracted while plastic material is initially injected into the mold cavity 16. The contact element 50 is shaped for contacting a large area of the cavity mold part 10 when the ram-shaped element 18 is protracted to thereby reduce the required force for clamping the mold while plastic material is initially injected into the mold cavity 16 when the ram-shaped element is protracted.

Figure 3:
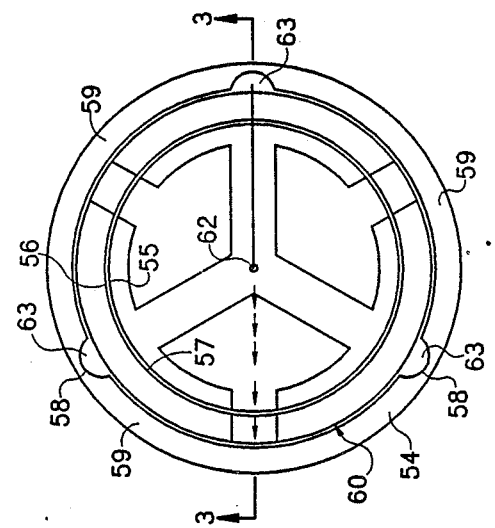
FIG. 3 is an end view of the mold cavity formed by the core mold part of the mold of FIGS. 1 and 2, with the product formed in the mold of FIGS. 1 and 2 retained on the core part, together with a second cavity mold part for forming a laminated product.

Referring to FIGS. 3 and 4, the mold described above with reference to FIGS. 1 and 2 can be used for laminating a hollow plastic product by further including a second cavity mold part 52.

The second cavity mold part 52, when assembled with the core mold part 12 by axial movement with respect to each other while the core mold part 12 is retaining a first layer 53 of the plastic product formed by plastic material inserted into the mold cavity 16 defined by the mold parts 10, 12, defines a second mold cavity 54 for forming a second layer of the plastic product.

The base-forming portion of the second cavity mold part 52 includes a second brink 55 that protrudes in a direction toward the core mold part 12. The base-forming portion of the first layer of plastic material 53 retained by the core mold part 12 includes a second labrum 56 formed in the first mold cavity 16 by the cavity mold part 10. The second labrum 56 protrudes in a direction toward the second cavity mold part 52 to define a second throttle 57 situated between the second brink 55 and the second labrum 56. The second throttle 57 has a variable width, which at any throttle position is defined by the distance between the second brink 55 and the second labrum 56.

The width of the second throttle 57 varies when the mold parts 12, 52 are not axially aligned to thereby, during injection, admit more material into the side wall-forming portion 58 of the second mold cavity 54 that is the thinnest as a result of said axial misalignment, for the purpose of forcing the mold parts 12, 52 into axial alignment.

The second mold cavity 54 inherently includes secondary flow channels 59 for directing plastic material injected into the second mold cavity 54 from the base-forming portion 60 of the second mold cavity toward the rim-forming portion 61 of the second mold cavity 54. The second mold cavity thickness of at least certain particular secondary flow channels 59 is significantly thicker than double the remaining prevailing second mold cavity 54 thickness between the certain particular secondary flow channels 59.

Plastic material is injected into the second mold cavity 54 through a gate 62 defined by the second cavity mold part 52.

The protruding sidewall areas 63 in the product layer 53 were formed by primary flow channels 28 included within the first mold cavity 16 (FIGS. 1 and 2).

Figure 6:
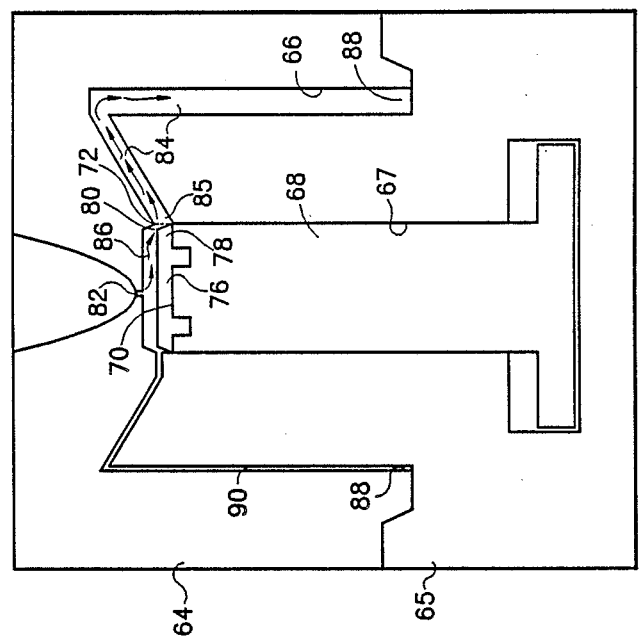
FIG. 6 is a sectional view of a mold defining the mold cavity of FIG. 5 taken along lines 6—6.
Figure 5:
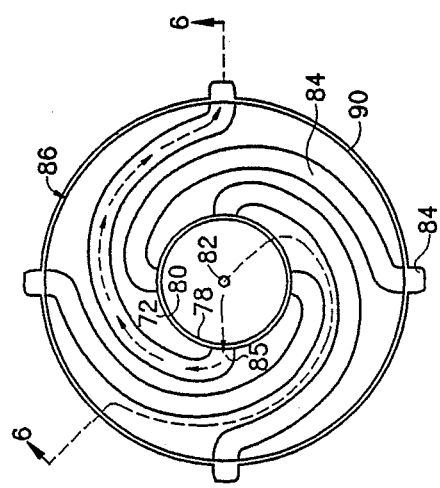
FIG. 5 is an end view of the mold cavity defined by an alternative preferred embodiment of the mold of the present invention.

Referring to FIGS. 5 and 6, an alternative preferred embodiment of the self-aligning mold of the present invention includles a cavity mold part 64 and a core mold part 65.

The cavity mold part 64 and the core mold part 65 are assembled by axial movement with respect to each other, and as so assembled, define a mold cavity 66 for forming a hollow plastic product having a rim, a base and a side wall therebetween.

The base forming portion of the core mold part 65 defines a conduit 67 and has an axially protractable and retractable ram-shaped element 68 within the conduit 67. A front portion 70 of the ram-shaped element 68 defines a portion of the mold cavity 66.

The base-forming portion of the cavity mold part 64 includes a lubrum 72 that protrudes in a direction toward the core mold part 65.

The front portion 70 of the ram-shaped element 68 and the cavity mold part 64 define a part of the mold cavity 66 for forming a portion 76 of the base of the product when the ram-shaped element 68 is protracted. The formed portion 76 of the product base is shaped by the cavity mold part 64 to define a brink 78 when the ram-shaped element 68 is retracted while retaining the portion 76 of the base of the product formed by injection of plastic material into the mold cavity 66 while the ram-shaped element 68 was protracted.

The brink 78 protrudes in a direction toward the cavity mold part 64 to define a throttle 80 situated between the brink 78 and the labrum 72. The throttle 80 has a variable width, which at any throttle position is defined by the distance between the brink 78 and the labrum 72.

The brink 78 does not project beyond the labrum 72. This feature prevents the brink 78 from contacting the lubrum 72. Such contact would cause damage to the labrum 72 and alter the dimensions of the throttle 80.

The cavity mold part 64 also defines a gate 82, which is located within an area encompassed by the throttle 80.

The width of the throttle 80 varies when the cavity mold part 64 and the core mold part 65 are not axially aligned to thereby, during injection of plastic material from the gate 82, admit more material into the side wall-forming portion of the mold cavity 66 that is the thinnest as a result of said axial misalignment, for the purpose of forcing the cavity mold part 64 and core mold part 65 into axial alignment.

The mold cavity 66 includes certain particular flow channels 84 for directing injected plastic material from the base-forming portion 86 of the mold cavity 66 toward the rim-forming portion 88 of the mold cavity 66. One end 85 of each of the certain particular flow channels 84 is located adjacent the throttle 80. The certain particular flow channels 84 have a mold cavity thickness that is significantly thicker than double the prevailing mold cavity thickness between the flow channels 84 when the cavity mold part 64 and the core mold part 65 are aligned and assembled. The mold cavity 66 may also include additional flow channels (not shown), which are generally thicker than the prevailing mold cavity thickness between the flow channels 84.

The certain particular flow channels 84 are shaped within the base-forming portion 88 of the mold cavity 66 to direct injected plastic material into the side-wall-forming portion 90 of the mold cavity at positions respectively located across the gate 82 from the positions where the one end 85 of each certain particular flow channel 84 is adjacent the throttle 80.

The certain particular flow channels 84 direct plastic into only those portions of the side-wall forming portion 90 of the mold cavity 66 as are between adjacent certain particular flow channels 84 and thus prevent such extensive lateral flow of the plastic material as would maintain the axial misalignment of the mold parts 64, 65. The direction of flow of the plastic material is illustrated by arrows in FIG. 5.

The respective sizes of the throttle 80, flow channels 84 and side-wall forming portion 90 of the mold cavity 66 are greatly exaggerated in relation to the size of the mold in order to better illustrate these features.

Figure 8:
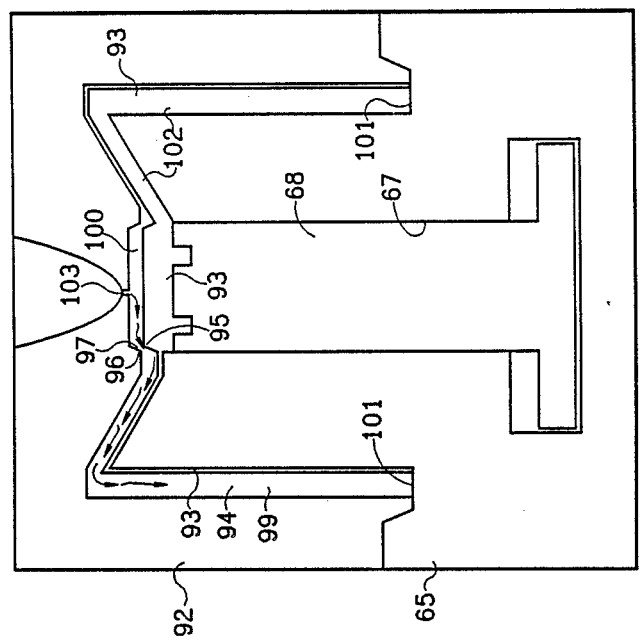
FIG. 8 is a topological sectional view of a mold defining the mold cavity of FIG. 7 taken along lines 8—8 in accordance with the distance from the mold cavity axis.
Figure 7:
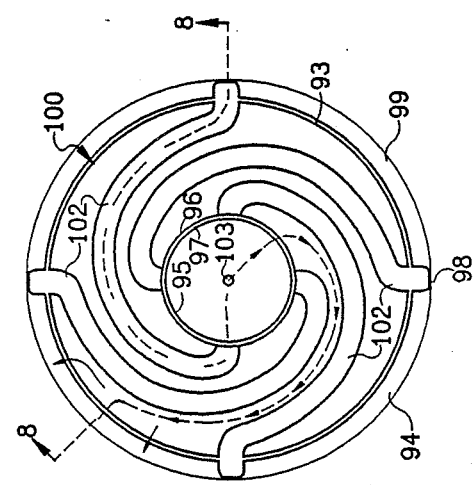
FIG. 7 is an end view of the mold cavity formed by the core mold part of the mold of FIGS. 5 and 6, with the product formed in the mold of FIGS. 5 and 6 retained on the core part, together with a second cavity mold part for forming a laminated product.

Referring to FIGS. 7 and 8, the mold described above with reference to FIGS. 3 and 4 can be used for laminating a hollow plastic product by further including a second cavity mold part 92.

The second cavity mold part 92, when assembled with the core mold part 65 by axial movement with respect to each other while the core mold part 65 is retaining a first layer 93 of the plastic product formed by plastic material inserted into the mold cavity 66 defined by the cavity mold part 64 and the core mold part 65, defines a second mold cavity 94 for forming a second layer of the plastic product.

The base-forming portion of the first layer of plastic material 93 retained by the core mold part 65 includes a second brink 95 formed in the first mold cavity 66 by the cavity mold part 64. The second brink 95 protrudes in a direction toward the second cavity mold part 92. The base-forming portion of the second cavity mold part 92 includes a second labrum 96 that protrudes in a direction toward the core mold part 65 to define a second throttle 97 situated between the second brink 95 and the second labrum 96. The second throttle 97 has a variable width, which at any throttle position is defined by the distance between the second brink 95 and the second labrum 96.

The width of the second throttle 97 varies when the mold parts 65, 92 are not axially aligned to thereby, during injection, admit more material into the side wall-forming portion 98 of the second mold cavity 94 that is the thinnest as a result of said axial misalignment, for the purpose of forcing the mold parts 65, 92 into axial alignment.

The second mold cavity 94 inherently includes secondary flow channels 99 for directing plastic material injected into the second mold cavity 94 from the base-forming portion 100 of the second mold cavity 94 toward the rim-forming portion 101 of the second mold cavity 94.

The second mold cavity thickness of at least certain particular secondary flow channels 99 is significantly thicker than double the remaining prevailing second mold cavity thickness between the certain particular secondary flow channels 99.

The serpentine areas 102 in the product layer 93 were formed by primary flow channels 84 included within the base forming portion 86 of the first mold cavity 66 (FIGS. 5 and 6).

Plastic material is injected into the second mold cavity 94 through a gate 103 defined by the second cavity mold part 92.

The embodiment of the invention described with reference to FIGS. 1 and 2 is well suited for molding plastic products having tear-away, twist-off or break-off sections, in that such products are weaker in the portion thereof defined by the throttle.

In an embodiment of the invention (not shown), wherein the mold described with reference to FIGS. 5 and 6 is modified so that the product layer 76 is a part of the ram-shaped element 68, the mold is well suited for molding plastic products small openings, such as a tube with a twist-off closure.

I claim:

1. A mold for injection molding and controlling the dimensions of a hollow plastic product having a rim, a base and a side wall therebetween, comprising
    a first mold part and a second mold part, which when assembled by axial movement with respect to each other, define a mold cavity for forming said plastic product;
    wherein a base-forming portion of the first mold part includes a brink that protrudes in a direction toward the second mold part, and a base-forming portion of the second mold part includes a labrum that protrudes in a direction toward the first mold part to define a throttle situated between said brink and said labrum, the throttle having a variable width, which at any throttle position is defined by the distance between said brink and said labrum;
    wherein the mold cavity defines a gate located within an area encompassed by the throttle;
    wherein the throttle width varies when the first and second mold parts are not axially aligned to thereby, during injection, admit more material into the side wall-forming portion of the mold cavity that is the thinnest as a result of said axial misalignment, for the purpose of forcing the first and second mold parts into alignment; and
    wherein the mold cavity includes flow channels for directing injected plastic material from the base-forming portion of the mold cavity toward the rim-forming portion of the mold cavity, with the mold cavity thickness at the flow channels being generally thicker than the prevailing mold cavity thickness between the flow channels, and with at least certain particular said flow channels having a mold cavity thickness that is significantly thicker than double said prevailing mold cavity thickness between said flow channels when the first and second mold parts are aligned and assembled.

2. A mold according the claim 1, wherein one end of each said certain particular flow channel is located adjacent the throttle.

3. A mold according to claim 2, wherein the first mold part is a core mold part for forming the inside of said hollow product and the second mold part in a cavity mold part for forming the outside of said product; and
    wherein at least one of said certain particular flow channels is shaped within the base-forming portion of the mold cavity to direct injected plastic material into the side-wall-forming portion of the mold cavity at a position located across the gate from the position where said one end of said certain particular flow channel is adjacent the throttle.

4. A mold according to claim 1, wherein the brink, when the first and second mold parts are aligned and assembled, does not project into and beyond the labrum.

5. A mold according the claim 1,
    wherein at least one of the mold parts defines an axial conduit and having an axially protractable and retractable ram-shaped element within the conduit, with a front portion of the ram-shaped element defining a part of the mold cavity; and
    wherein the mold further comprises means for retracting the ram-shaped element during injection after an initial amount of plastic material has been injected into the mold cavity.

6. A mold according to claim 1, wherein at least one of the mold parts defines an axial conduit and having an axially protractable and retractable ram-shaped element within the conduit, with a front portion of the ram-shaped element defining a part of the mold cavity for forming a portion of the base of the product when the ram-shaped element is protracted, with said formed portion of the product base defining said brink or said labrum when the ram-shaped element is retracted while retaining said portion of the base of the product formed by injection of plastic material into the mold cavity while the ram-shaped element was protracted.

7. A mold according to claim 1, wherein the base-forming portion of the mold cavity includes at least one feed channel that extends adjacent and collaterally to the throttle on the side of the throttle that is closest to the gate.

8. A mold according to claim 1, wherein the base-forming portion of the mold cavity includes at least one feed channel that extends adjacent and collaterally to the throttle on the side of the throttle that is closest to the side wall.

9. A mold according to claim 1, wherein the base-forming portion of the mold cavity includes at least two feed channels that extend adjacent and collaterally to the throttle, with at least one of said feed channels being on the side of the throttle that is closest to the gate, and with at least one of said feed channels being on the side of the throttle that is closest to the side wall.

10. A mold according to claim 1, for additionally laminating said hollow plastic product, further comprising
    a third mold part, which, when assembled with the first mold part by axial movement with respect to each other while the first mold part is retaining a first layer of said plastic product formed by plastic material inserted into the first mold cavity, defines a second mold cavity for forming a second layer of said plastic product.

11. A mold according to claim 10,
    wherein the base-forming portion of the first layer of plastic material retained by the first mold part includes a second brink or a second labrum formed in the first mold cavity by said second mold part, with said second brink or said second labrum protruding in a direction toward the third mold part, and the base-forming portion of the third mold part includes a second labrum or a second brink respectively that protrudes in a direction toward the first mold part to define a second throttle situated between said second brink and said second labrum, the second throttle having a variable width, which at any throttle position is defined by the distance between said second brink and said labrum; and wherein the second throttle width varies when the first and third mold parts are not axially aligned to thereby, during injection, admit more material into the side wall-forming portion of the second mold cavity that is the thinnest as a result of said axial misalignment, for the purpose of forcing the first and third mold parts into axial alignment.

12. A mold according to claim 11, wherein the first layer of plastic material is so shaped by the first mold cavity as to define secondary flow channels in the second mold cavity for directing plastic material injected into the second mold cavity from the base-forming portion of the second mold cavity toward the rim-forming portion of the second mold cavity; and wherein the second mold cavity thickness of at least certain particular said secondary flow channels is significantly thicker than double the remaining prevailing second mold cavity thickness between the secondary flow channels.

13. A mold for injection molding and controlling the dimensions of a hollow plastic product having a rim, a base and a side wall therebetween, comprising a first mold part and a second mold part, which when assembled by axial movement with respect to each other, define a mold cavity for forming said plastic product;

wherein a base-forming portion of the first mold part includes a brink that protrudes in a direction towards the second mold part, and a base-forming portion of the second mold part includes a labrum that protrudes in a direction toward the first mold part to define a throttle situated between said brink and said labrum, the throttle having a variable width, which at any throttle position is defined by the distance between said brink and said labrum;

wherein the mold cavity defines a gate located within an area encompassed by the throttle;

wherein the throttle width varies when the first and second mold parts are not axially aligned to thereby, during injection, admit more material into the side wall-forming portion of the mold cavity that is the thinnest as a result of said axial misalignment, for the purpose of forcing the first and second mold parts into alignment;

wherein at least one of the mold parts defines an axial conduit and having an axially protractable and retractable ram-shaped element within the conduit, with a front portion of the ram-shaped element defining a part of the mold cavity; and wherein the mold further comprises means for retracting the ram-shaped element during injection after an initial amount of plastic material has been injected into the mold cavity.

14. A mold according to claim 13, wherein the front portion of the ram-shaped element encompasses said brink or said labrum, so that the throttle width may be increased when the ram-shaped element is retracted in order to form a thicker-walled product at the throttle.

15. A mold according to claim 13, wherein the front portion of the ram-shaped element includes a contact element for contacting the other mold part in such a manner as to rigidly secure the first mold part in alignment with the second mold part when the ram-shaped element is protracted while plastic material is initially into the mold cavity.

16. A mold according to claim 13, wherein the front portion of the ram-shaped element includes a contact element shaped for contacting a large area of the other mold part when the ram-shaped element is protracted to thereby reduce the required force for clamping the mold while plastic material is initially injected into the mold cavity when the ram-shaped element is protracted.

17. A mold according the claim 13, when said front portion of the ram-shaped element defines a part of the mold cavity for forming a portion of the base of the product when the ram-shaped element is protracted, with said formed portion of the product base defining said brink or said labrum when the ram-shaped element is retracted while retaining said portion of the base of the product formed by injection of plastic material into the mold cavity while the ram-shaped element was protracted.

18. A mold for injection molding, laminating and controlling the dimensions of a hollow plastic product having a rim, a base and a side wall therebetween, comprising a first mold part and a second mold part, which when assembled by axial movement with respect to each other, define a first mold cavity for forming said plastic product;

a third mold part, which, when assembled with the first mold part by axial movement with respect to each other while the first mold part is retaining a first layer of said plastic product formed by plastic material inserted into the first mold cavity, defines a second mold cavity for forming a second layer of said plastic product;

wherein the base-forming portion of the first layer of plastic material retained by the first mold part includes a brink or a labrum formed in the first mold cavity by said second mold part, with said brink of said labrum protruding in a direction toward the third mold part, and the base-forming portion of the third mold part includes a labrum or a brink respectively that protrudes in a direction toward the first mold part to define a throttle situated between said brink and said labrum, the throttle having a variable width, which at any throttle position is defined by the distance between said brink and said labrum; and wherein the throttle width varies when the first and third mold parts are not axially aligned to thereby, during injection, admit more material into the side wall-forming portion of the second mold cavity that is the thinnest as a result of said axial misalignment, for the purpose of forcing the first mold parts into axial alignment.

19. A mold according to claim 18, wherein the second mold cavity includes flow channels for directing plastic material injected into the second mold cavity from the base-forming portion of the second mold cavity toward the rim-forming portion of the second mold cavity.

20. A mold according to claim 18, wherein a base-forming portion of the first mold part includes a second brink that protrudes in a direction toward the second mold part, and a base-forming portion of the second mold part includes a second labrum that protrudes in a direction toward the first mold part to define a second throttle situated between said second brink and said labrum, the second throttle having a variable width, which at any throttle position is defined by the distance between said second brink and said second labrum;

wherein the second mold cavity defines a gate located within an area encompassed by the second throttle;

wherein the second throttle width varies when the first and second mold parts are not axially aligned to thereby, during injection, admit more material into the side wall-forming portion of the second mold cavity that is the thinnest as a result of said axial misalignment, for the purpose of forcing the first and second mold parts into alignment.

21. A mold according to claim 18, wherein the second mold cavity includes flow channels for directing injected plastic material from the base-forming portion of the second mold cavity toward the rim-forcing portion of the second mold cavity, with the second mold cavity thickness at the flow channels being generally thicker than the prevailing mold cavity thickness between the flow channels.

22. A mold according to claim 18, wherein in first mold cavity includes flow channels for directing injected plastic material from the base-forming portion of the first mold cavity toward the rim-forming portion of the first mold cavity, with the first mold cavity thickness at the flow channels being generally thicker than the prevailing mold cavity thickness between the flow channels; and wherein the first layer of plastic material is so shaped by the first mold cavity as to define secondary flow channels in the second mold cavity for directing plastic material injected into the second mold cavity from the base-forming portion of the second mold cavity toward the rim-forming portion of the second mold cavity.

23. A mold for injection molding and laminating a hollow plastic product having a rim, a base and a side wall therebetween, comprising a first mold part and a second mold part, which when assembled by axial movement with respect to each other, define a first mold cavity for forming said plastic product;

wherein the first mold cavity includes primary flow channels for directing injected plastic material from the base-forming portion of the first mold cavity toward the rim-forming portion of the first mold cavity, with the first mold cavity thickness at the primary flow channels being generally thicker than the prevailing mold cavity thickness between the primary flow channels;

the mold further comprising a third mold part, which, when assembled with the first mold part by axial movement with respect to each other while the first mold part is retaining a first layer of said plastic product formed by plastic material inserted into the first mold cavity, defines a second mold cavity for forming a second layer of said plastic product;

wherein the first layer of plastic material is so shaped by the first mold cavity as to define secondary flow channels in the second mold cavity for directing plastic material injected into the second mold cavity from the base-forming portion of the second mold cavity toward the rim-forming portion of the second mold cavity.

24. A mold for injection molding, laminating and controlling the dimensions of a hollow plastic product having a rim, a base and a side wall therebetween, comprising a first mold part and a second mold part, which when assembled by axial movement with respect to each other, define a mold cavity for forming said plastic product;

wherein a base-forming portion of the first mold part includes a brink that protrudes in a direction toward the second mold part, and a base-forming portion of the second mold part inclues a labrum that protrudes in a direction toward the first mold part to define a throttle situated between said brink and said labrum, the throttle having a variable width, which at any throttle position is defined by the distance between said brink and said labrum;

wherein the mold cavity defines a gate located within an area encompassed by the throttle; and wherein the throttle width varies when the first and second mold parts are not axially aligned to thereby, during injection, admit more material into the side wall-forming portion of the mold cavity that is the thinnest as a result of said axial misalignment, for the purpose of forcing the first and second mold parts into alignment;

the mold further comprising a third mold part, which, when assembled with the first mold part by axial movement with respect to each other while the first mold part is retaining a first layer of said plastic product formed by plastic material inserted into the first mold cavity, defines a second mold cavity for forming a second layer of said plastic product.

25. A mold according to claim 24, wherein the base-forming portion of the first layer of plastic material retained by the first mold part includes a second brink or a second labrum formed in the first mold cavity by said second mold part, with said second brink or said second labrum protruding in a direction toward the third mold part, and the base-forming portion of the third mold part includes a second labrum or a second brink respectively that protrudes in a direction toward the first mold part to define a second throttle situated between said second brink and said second labrum, the second throttle having a variable width, which at any throttle position is defined by the distance between said second brink and said second labrum; and wherein the second throttle width varies when the first and third mold parts are not axially aligned to thereby, during injection, admit more material into the side wall-forming portion of the second mold cavity that is the thinnest as a result of said axial misalignment, for the purpose of forcing the first and third mold parts into axial alignment.

26. A mold according to claim 24, wherein the first mold cavity includes primary flow channels for directing injected plastic material from the base-forming portion of the first mold cavity toward the rim-forming portion of the first mold cavity, with the first mold cavity thickness at the primary flow channels being generally thicker than the prevailing mold activity thickness between the primary flow channels.

27. A mold according to claim 24, wherein the second mold cavity includes secondary flow channels for directing plastic material injected into the second mold cavity from the base-forming portion of the second mold cavity toward the rim-forming portion of the second mold cavity.

28. A mold according to claim 24,
wherein the first mold cavity includes primary flow channels for directing injected plastic material from the base-forming portion of the first mold cavity toward the rim-forming portion of the first mold cavity, with the first mold cavity thickness at the primary flow channels being generally thicker than the prevailing mold cavity thickness between the primary flow channels; and
wherein the first layer of plastic material is so shaped by the first mold cavity as to define secondary flow channels in the second mold cavity for directing plastic material injected into the second mold cavity from the base-forming portion of the second mold cavity toward the rim-forming portion of the second mold cavity.

29. A mold for injection molding and controlling the dimensions of a hollow plastic product having a rim, a base and a side wall therebetween, comprising
a first mold part and a second mold part, which when assembled by axial movement with respect to each other, define a mold cavity for forming said plastic product;
wherein a base-forming portion of the first mold part includes a brink that protrudes in a direction toward the second mold part, and a base-forming portion of the second mold part includes a labrum that protrudes in a direction toward the first mold part to define a throttle situated between said brink and said labrum, the throttle having a variable width, which at any throttle position is defined by the distance between said brink and said labrum;
wherein the mold cavity defines a gate located within an area encompassed by the throttle;
wherein the throttle width varies when the first and second mold parts are not axially aligned to thereby, during injection, admit more material into the side wall-forming portion of the mold cavity that is the thinnest as a result of said axial misalignment, for the purpose of forcing the first and second mold parts into alignment; and
wherein the brink, when the first and second mold parts are aligned and assembled, does not project into and beyond the labrum.

* * * * *